(12) United States Patent
Abe et al.

(10) Patent No.: US 8,170,061 B2
(45) Date of Patent: May 1, 2012

(54) COMMUNICATION DEVICE

(75) Inventors: Hideo Abe, Kawasaki (JP); Kenji Fukuda, Kawasaki (JP); Mitsunari Takahashi, Kawasaki (JP); Kazuhiro Yasuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 283 days.

(21) Appl. No.: 12/568,358

(22) Filed: Sep. 28, 2009

(65) Prior Publication Data
US 2010/0020800 A1    Jan. 28, 2010

Related U.S. Application Data

(63) Continuation of application No. PCT/JP2007/056892, filed on Mar. 29, 2007.

(51) Int. Cl.
*H04J 3/24* (2006.01)
(52) U.S. Cl. ......................... 370/474; 370/392
(58) Field of Classification Search .................. None
See application file for complete search history.

(56) References Cited

U.S. PATENT DOCUMENTS

| | | | |
|---|---|---|---|
| 6,381,240 B1 | 4/2002 | Muto | |
| 2005/0243834 A1* | 11/2005 | Fukuda | 370/395.1 |
| 2006/0029102 A1 | 2/2006 | Abe | |
| 2006/0039379 A1 | 2/2006 | Abe | |
| 2006/0153225 A1 | 7/2006 | Kamiya | |
| 2009/0003383 A1* | 1/2009 | Watanabe et al. | 370/474 |
| 2010/0020800 A1* | 1/2010 | Abe et al. | 370/392 |

FOREIGN PATENT DOCUMENTS

| | | |
|---|---|---|
| JP | 5207041 | 8/1993 |
| JP | 10285234 | 10/1998 |
| JP | 2004147164 | 5/2004 |
| JP | 200674726 | 3/2006 |
| WO | 2004107683 | 12/2004 |
| WO | 2006085374 | 8/2006 |

OTHER PUBLICATIONS

International Search Report dated May 15, 2007 received in corresponding PCT/JP2007/056892.

* cited by examiner

*Primary Examiner* — Robert Wilson
(74) *Attorney, Agent, or Firm* — Murphy & King, P.C.

(57) ABSTRACT

A device including: a receiving unit receiving a packet; a packet determining unit determining whether the received packet is a head fragment packet or an intermediate or last fragment packet; a search control unit using search data registered previously for searching for packet information and search data used for identifying the same fragment of the fragment packet on the same search address; and an assembly processing unit assembling the fragment packets, wherein the search control unit extracts a fragment identifier from the head fragment packet and registers the fragment identifier as the search data on the same search address as the search address of the search data registered previously for searching for the packet information and extracts the fragment identifier of the intermediate fragment packet or the last fragment packet, makes a search in a way that uses the fragment identifier as search target data, and assembles the fragment packets.

5 Claims, 20 Drawing Sheets

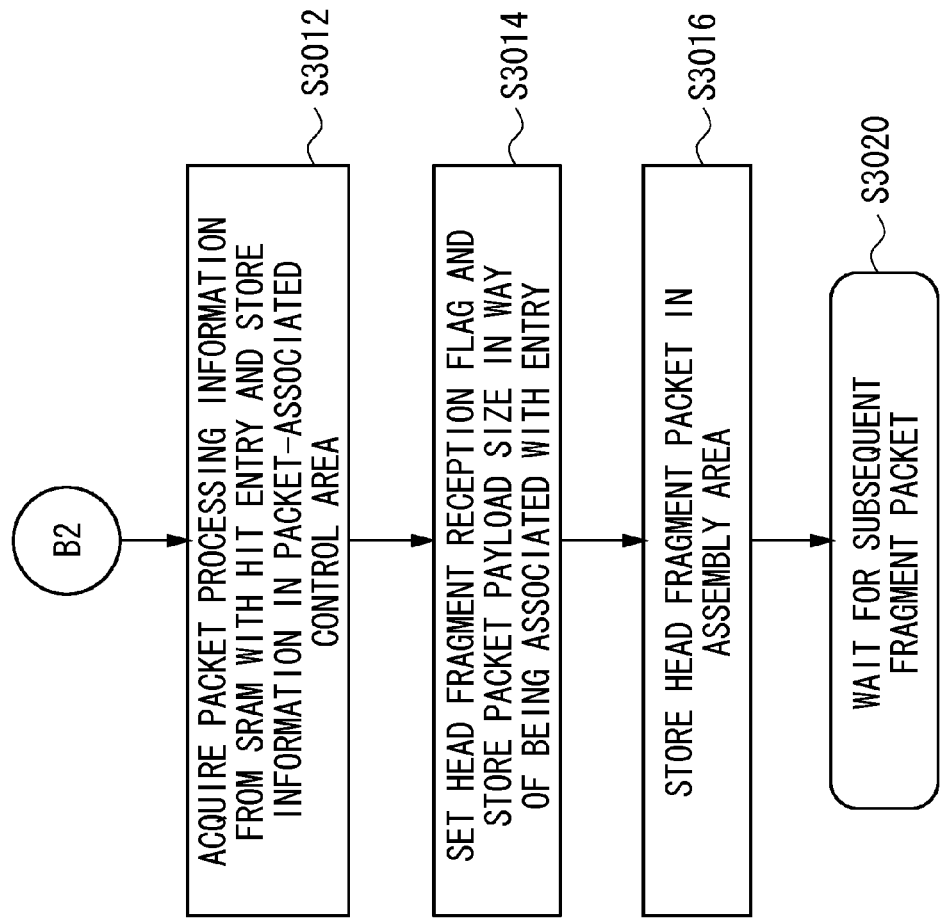
F I G. 5

FIG. 14

INTERMEDIATE FRAGMENT PACKET,
LAST FRAGMENT PACKET
(HEAD FRAGMENT PACKET NOT YET RECEIVED)

SEARCH WITH
ID,
SOURCE IP ADDRESS

| Destination Port | Source Port | Protocol | Source IP Address | Destination IP Address |
|---|---|---|---|---|

FIG. 19
Related Art

| | M=1 | M=0 |
|---|---|---|
| F.O.=0 | HEAD FRAGMENT PACKET | (NORMAL PACKET) |
| F.O.≠0 | INTERMEDIATE FRAGMENT PACKET | LAST FRAGMENT PACKET |

F.O. : Fragment Offset (FRAGMENT OFFSET VALUE)

COMMUNICATION DEVICE

CROSS-REFERENCE TO RELATED APPLICATION

This is a continuation of application PCT/JP2007/056892, filed on Mar. 29, 2007, now pending, the contents of which are herein wholly incorporated by reference.

FIELD

The present invention relates to a communication device which transmits and receives packet data via a network, and more particularly to a communication device which executes a process of reassembling fragment packets transmitted and received in fragmentation.

BACKGROUND

With speed-up of the network, it is a general practice to utilize a CAM (Content Addressable Memory) for executing a process of searching for route information etc at a high speed in the communication device. The CAM, if search target data is inputted to and contained in a pre-registered table, outputs an address (Entry number) thereof. The CAM, which is generally combined with an external SRAM (Static Random Access Memory), reads the route information etc registered in the SRAM with reference to the Entry number, and notifies of the route information etc. This scheme enables the fast search process to be done hardwarewise. Especially, if a T-CAM (Ternary CAM) capable of dynamically designating the search target data from the registered data is utilized, it is feasible to attain the search in a way that designates the search target data on the basis of a type of a received packet.

For example, in the case of searching for a route of an IPv4 (UDP (User Datagram Protocol)) packet, the route is searched for with items of data such as Destination IP Address, source IP Address, Protocol, Source Port and Destination Port, then packet processing information etc stored in the way of being associated with Entry is read based on the coincident Entry number, notification of the readout information is given, and a route process, QoS (Quality of Service) control, etc are carried out based on the readout information.

On the other hand, in the case of reassembling the fragmented packets at the high speed, there is a case of receiving the plurality of fragment packets in a simultaneous multiplexing mode from the network, and hence it is effective to identify the same fragment packet by utilizing the CAM.

FIG. 16 is a diagram illustrating an example of a configuration of a conventional communication device which executes the process of reassembling the fragment packets.

FIG. 17 is a diagram illustrating an example of a fragment format of the IPv4 packet (UDP packet). FIG. 17 illustrates the example of fragmenting data into 3 packets.

In FIG. 17, in the case of the fragmentation into the 3 packets, the data having an IPv4 header is fragmented into data 1 having a length L1, data 2 having a length L2 and data 3 having a length L3. The IPv4 header is attached to each piece of data. Further, a UDP header is also attached to the head data.

FIG. 18 is a diagram illustrating an example of a structure of the IPv4 header. The IPv4 header has Total Length (total length), ID (Identification), D flag (Don't fragment flag), M flag (More Fragment (continuous) flag), Fragment Offset (fragment offset value), Protocol, Source IP Address, Destination IP Address, etc.

The D flag is a flag for distinguishing whether the packet is the fragment packet or not. If the D flag is set such as D=0, this connotes that the packet is not the fragment packet (but a normal packet), and, if the D flag is set such as D=1, this connotes that the packet is the fragment packet.

The M flag is a flag for distinguishing whether the continuous packet exists or not. If the M flag is set such as M=0, this connotes that the continuous packet does not exist, and, if the M flag is set such as M=1, this connotes that the continuous packet exists. Namely, in the IPv4 header of a certain packet, when the D flag is set such as D=1 and when the M flag is set such as M=0, this connotes that the packet is a last fragment packet.

The fragment offset value represents a size from the header of the head packet in a start position of payload data. When the fragment offset value is 0, this connotes that the packet is a head fragment packet.

The ID (Identification) is unique information for identifying the data. The same ID is assigned to the data fragmented from the same data.

FIG. 19 is a diagram illustrating a relation between the M flag, the fragment offset value and the packet type in the IPv4 header. For example, when M=1 and when F.O. (Fragment Offset, fragment offset value)=0, the packet is the head fragment packet. When M=0 and when F.O.=0, the packet is the normal packet, however, the determination about whether the packet is the normal packet or not is made based on the D flag.

FIG. 20 is a diagram illustrating an example of a structure of the UDP header. The UDP header has Source Port, Destination Port, Length and Checksum.

With respect to the received packet received by a packet receiving unit 110 of the communication device, a fragment determining unit 120 determines whether the packet is the fragment packet or not and determines the type of the fragment packet. The determination about whether the packet is the fragment packet or not and the determination about the packet type can be made in the following manner.

The fragment determining unit 120 determines from the D flag (Don't fragment flag) in the IPv4 header whether the packet is the fragment packet or not. The fragment determining unit 120 determines from the M flag (More Fragment (continuous) flag) in the IPv4 header whether the packet is the last fragment packet or not. Further, the fragment determining unit 120, when M=1 and when Fragment Offset=0 in the IPv4 header, determines that the packet is the head fragment packet.

The same fragment packet in the fragment packets which are received in the simultaneous multiplexing mode from a plurality of transmitting sources can be identified by use of ID (identification) and Source IP address.

A fragment packet search control unit 132 searches through a CAM 134 in a way that uses the ID and Source IP Address in the fragment packet as search data. A fragment packet search result determining unit 136 identifies, when coincident by the search, the same fragment packet by notifying of Entry number as a subsequent fragment packet and accumulates the packets. There is a case in which a sequence of the fragment packets might be reversed within the network, and hence an assembly control unit 138 assembles the fragment packets according to the fragment offset value, thereby executing a reassembly process (assembly process).

After the assembly control unit 138 has reassembled the fragment packets, a search control unit 140 searches for the route in the same way with the packet other than the fragment packet. A packet processing unit 160 executes a packet process such as routing and QoS control on the basis of the route search result information of the search control unit 140.

[Patent document 1] Japanese Patent Laid-Open Publication No. 2006-74726

[Patent document 2] Japanese Patent Laid-Open Publication No. H10-285234

[Patent document 3] Japanese Patent Laid-Open Publication No. H05-207041

In the communication device depicted in FIG. 16, the search for the normal route and the search for the reassembly process are separately performed, and hence there is such a defect that each is desired to have Entry, resulting in increases in desired capacity of the CAM and in size of the search control unit as well.

SUMMARY

According to an aspect of the invention, a communication device transmitting and receiving packet data via a network, includes:

a receiving unit receiving a packet;

a packet determining unit determining whether the received packet is a fragment packet or not and determining, if the received packet is the fragment packet, whether the received packet is a head fragment packet or an intermediate or last fragment packet;

a search control unit using search data registered previously for searching for packet information and search data used for identifying the same fragment of the fragment packet on the same search address; and an assembly processing unit assembling the fragment packets having the same fragment identification into one packet, wherein the search control unit, if the received packet is the head fragment packet, extracts a fragment identifier from the head fragment packet and registers the fragment identifier as the search data on the same search address as the search address of the search data registered previously for searching for the packet information and, if the received packet is the intermediate fragment packet or the last fragment packet, extracts the fragment identifier of the intermediate fragment packet or the last fragment packet, makes a search in a way that uses the fragment identifier as search target data, and assembles the fragment packets having the same fragment identifier.

Further, with a reversed sequence of the fragment packets, in the case of receiving the intermediate fragment packet or the last fragment packet before registering the fragment identifier of the head fragment packet, such a problem arises that the search for the intermediate fragment packet or the last fragment packet may not be made. To cope with this problem, the communication device is configured so that if not coincident in the search for the intermediate fragment packet or the last fragment packet, the search for the intermediate fragment packet or the last fragment packet is again made till waiting for receiving the head fragment packet.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 5 is a flowchart illustrating an example (4) of the processing flow of the communication device in the embodiment.

FIG. 14 is a diagram illustrating how the CAM is used.

FIG. 19 is a diagram illustrating a relationship between an M flag, a fragment offset value and a packet type in the IPv4 header.

DESCRIPTION OF EMBODIMENTS

An embodiment of the present invention will hereinafter be described with reference to the drawings. A configuration in the embodiment is an exemplification, and the technical scope of the present invention is not limited to the configuration in the embodiment.

<Configuration>

Figure 1:
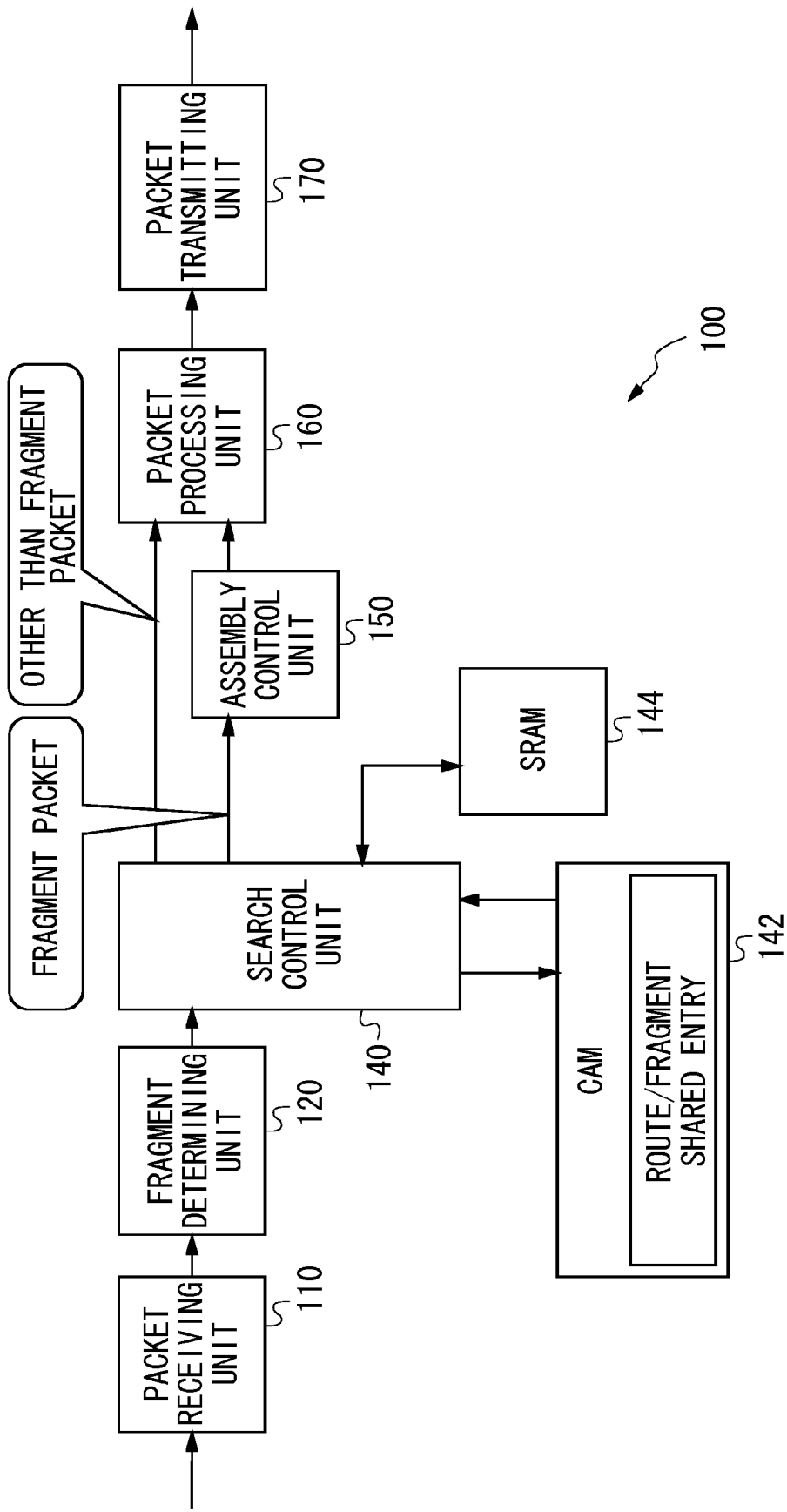
FIG. 1 is a diagram illustrating a communication device which executes a reassembly process in an embodiment.

FIG. 1 is a diagram illustrating an example of a block-formatted configuration of a communication device in the embodiment.

A communication device 100 in the embodiment includes a packet receiving unit 110, a fragment determining unit 120, a search control unit 140, a CAM (Content Addressable Memory) 142, an SRAM (Static Random Access Memory) 144, an assembly control unit 150, a packet processing unit 160 and a packet transmitting unit 170.

The packet receiving unit 110 receives a packet transmitted from another communication device. The packet receiving unit 110 sends the received packet to the fragment determining unit 120.

The fragment determining unit 120 determines whether the received packet is a fragment packet or not. The fragment determining unit 120 checks a D (Don't Fragment) flag registered in an IPv4 header of the received packet.

The fragment determining unit 120, if proves from a result of checking the D flag that D=1, determines that the received packet is the fragment packet. Further, the fragment determining unit 120, if proves from the result of checking the D flag that D=0, determines that the received packet is not the fragment packet (but a normal packet).

The search control unit 140 has an assembly area, a packet-associated control area and a search control area.

The search control unit 140 receives the fragment determination result and the received packet from the fragment determining unit 120.

The search control unit 140, if the received packet is not the fragment packet (but the normal packet), extracts Source IP address, Destination IP address, Protocol, UDP Source Port, UDP Destination Port which are pieces of search data from the packet, and requests the CAM 142 to make a search.

The search control unit 140, if there is a hit Entry as a result of the search, fetches packet processing information associated with the Entry from the SPAM 144, and stores the packet processing information in the packet-associated control area. The search control unit 140, if there is no hit Entry (Miss Hit) as the result of the search, discards the packet.

The search control unit 140, if the received packet is a head fragment packet, extracts Source IP address, Destination IP address, Protocol, UDP Source Port, UDP Destination Port which are the search data from the packet, and requests the CAM 142 to make the search.

The search control unit 140, if there is the hit Entry as the result of the search, fetches the packet processing information associated with the Entry from the SPAM 144, and stores the packet processing information in the packet-associated control area. The search control unit 140, if there is no hit Entry (Miss Hit), discards the packet. Further, in the case of Miss Hit, an available processing method is that a higher-order control unit is notified of this purport without discarding the packet.

The search control unit 140, if there is the hit Entry, registers an ID (Identification) of IPv4 of the received packet in the hit Entry. Further, the search control unit 140 sets the fragment packet control area associated with the hit Entry, and stores a head fragment reception flag and a size (bits) of a packet payload therein.

The search control unit 140, if the received packet is an intermediate fragment packet or a last fragment packet, extracts the Source IP Address and the ID information from the received packet and requests the CAM 142 to make the search. The search control unit 140, if the there is the hit Entry as the result of the search, executes a reassembly process in a way that stores the payload in an assembly area according to a fragment offset value in the way of being associated with the Entry.

The search control unit 140, if there is no hit Entry as the result of the search, executes a re-searching process. The search control unit 140, if unable to receive the head fragment packet due to a packet loss etc, counts a re-search count and, if count-over occurs, discards the packet.

The search control unit 140, if the hit packet proves to be the intermediate fragment packet as the result of the search, adds the packet payload size. The search control unit 140, if the last fragment packet has already been received, compares the stored Offset value of the last fragment packet with the added value of the packet payload size. The search control unit 140, if coincident with each other as a result of the comparison, decides that all of the fragment packets have been already received, and hands over the process to the assembly control unit 150. The payload size of the packets other than the last fragment packet is added to the packet payload added value.

The search control unit 140, if the last fragment packet is not yet received, or if the fragment offset value of the last is not coincident with the packet payload size added value, waits for receiving the subsequent fragment packet.

The search control unit 140, if the hit packet proves to be the last fragment packet as the result of the search, compares the stored payload added value of the packets other than the last fragment packet with the last fragment offset value. The search control unit 140, if coincident with each other as the result of the comparison, decides that all of the fragment packets have been already received, and hands over the process to the assembly control unit 150.

The search control unit 140, if the fragment offset value of the last fragment packet is not coincident with the packet payload size added value, waits for receiving the subsequent fragment packet.

Herein, the process for the UDP packet is discussed, however, the search control and the reassembly process of the fragment packet can be conducted in the same way with other types of packets.

The assembly control unit 150 reassembles a series of fragment packets (each of the fragment packets has a common ID and a common Source IP Address) processed by the search control unit 140 in a way that reads the data thereof from the assembly area. The assembly control unit 150 transmits the reassembled packet to the packet processing unit 160.

The packet processing unit 160 receives the normal packet from the search control unit 140 and receives the reassembled fragment packet from the assembly control unit 150. The packet processing unit 160 executes the packet process such as routing and QoS (Quality of Service) control on the basis of the items of search result information about a route etc, which are given from the search control unit 140.

The packet transmitting unit 170 transmits the packet processed by the packet processing unit 160 to another communication device.

Operational Example

An in-depth description of a processing flow of the search control unit will hereinafter be made.

FIGS. 2, 3, 4, 5, 6, 7 and 8 are flowcharts each illustrating the processing low of the search control unit in the embodiment.

When the received packet and the fragment determination result are inputted from the fragment determining unit 120, the search control unit 140 decides whether the received packet is fragment packet or not. The fragment determining unit 120 checks the D flag in the IPv4 header of the received packet, thereby deciding whether the received packet is the fragment packet or not. The packet is determined to be the fragment packet when the D flag is set such as D=1, and is determined not to be the fragment packet (but to be the normal packet) when the D flag is set such as D=0. The search control unit 140 decides based on the result of this determination whether the received packet is the fragment packet or not (FIG. 2: S1004).

(Normal Packet)

Figure 2:
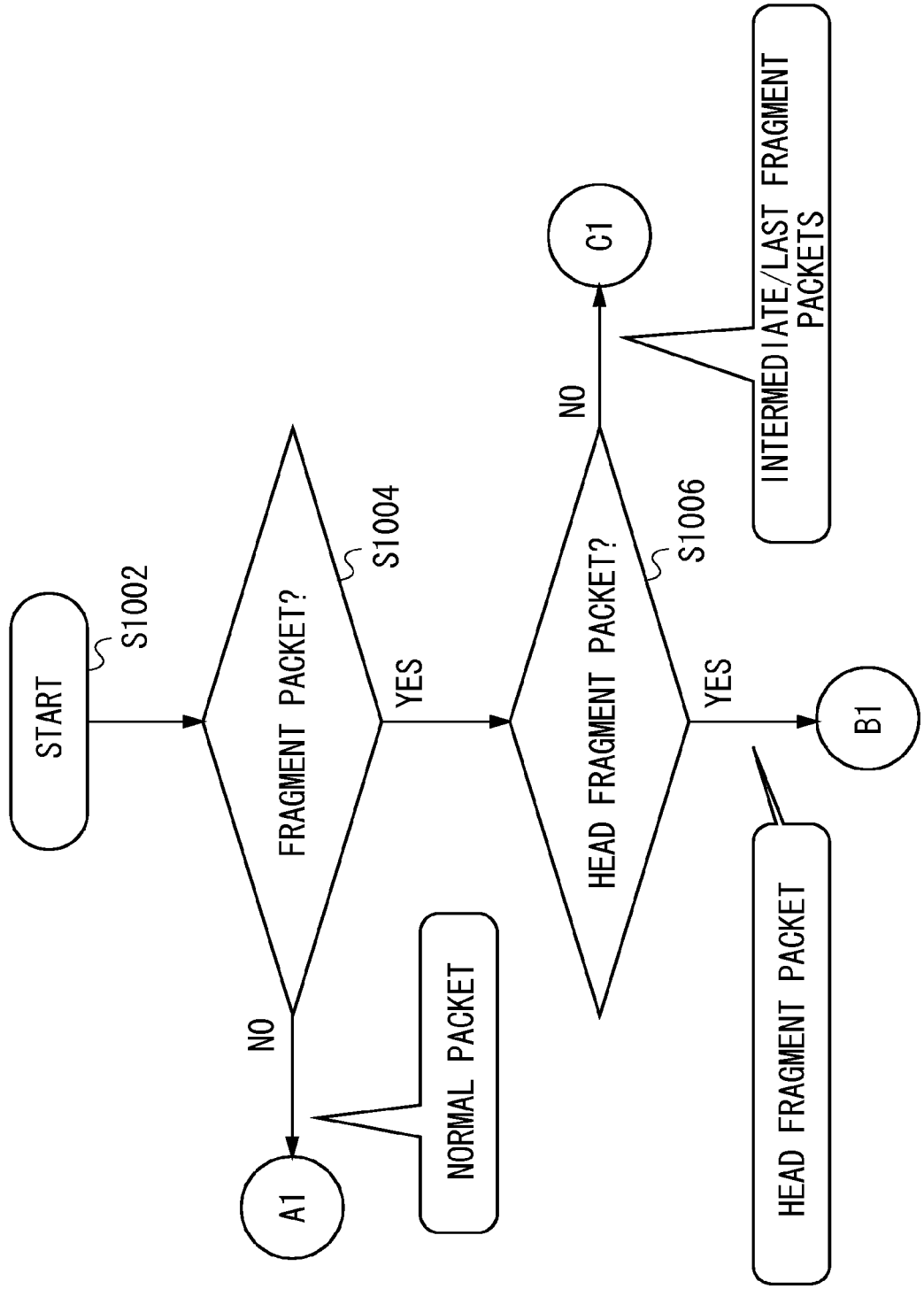
FIG. 2 is a flowchart illustrating an example (1) of a processing flow of the communication device in the embodiment.

If the received packet is determined not to be the fragment packet (but to be the normal packet) (FIG. 2: S1004; NO), the search control unit 140 extracts the Source IP address, the Destination IP address and the Protocol from the IPv4 header of the received packet and extracts the Source Port and the Destination Port from the UDP header (FIG. 3: S2002). The search control unit 140 request the CAM 142 to search for the search targets such as the Source IP address, the Destination IP address, the Protocol, the Source Port and the Destination Port (FIG. 3: S2004).

Figure 12:
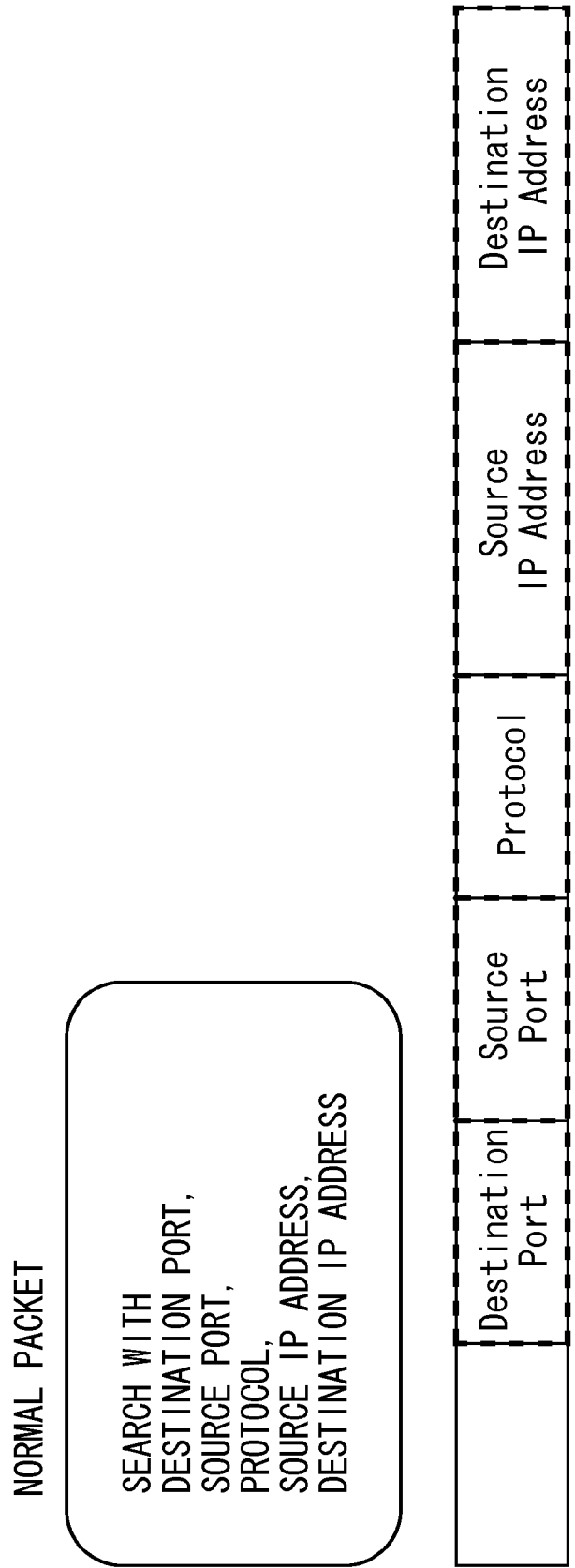
FIG. 12 is a diagram illustrating how a CAM is used.

FIG. 12 is a diagram illustrating an example of how the CAM is used. At least the Source IP address, the Destination IP address, the Protocol, the Source Port and the Destination Port are previously registered in the CAM 142. In the case of the normal packet, the Source IP address, the Destination IP address, the Protocol, the Source Port and the Destination Port become the search targets.

The search control unit 140 receives the search result from the CAM 142. If there is the hit Entry as the result of the search (FIG. 3: S2006; YES), the search control unit 140 acquires the packet processing information of the packet that is stored in the SPAM 144, and stores this information in the packet-associated control area (FIG. 3: S2012). The search control unit 140 transmits the packet to the packet processing unit 160. This packet is packet-processed by the packet processing unit 160 (FIG. 3: S2050).

Figure 3:
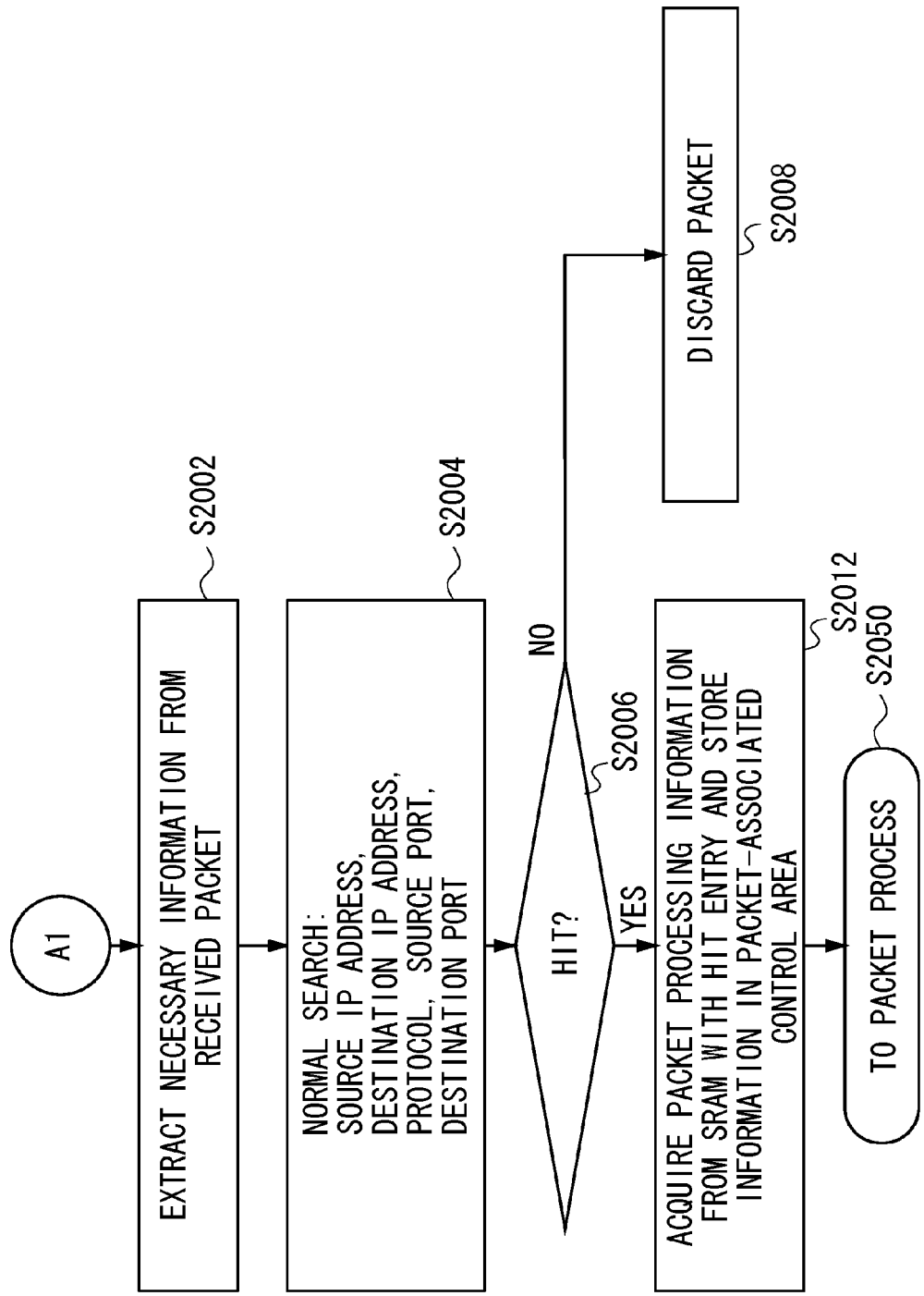
FIG. 3 is a flowchart illustrating an example (2) of the processing flow of the communication device in the embodiment.

Further, if there is not the hit Entry as the result of the search (FIG. 3: S2006; NO), this packet is unnecessary for the communication device 100 and is therefore discarded (FIG. 3: S2008). Note that another available processing method is a method of notifying the higher-order control unit of this purport without discarding the packet.

(Head Fragment Packet)

Referring back to FIG. 2, if the received packet is determined to be the fragment packet (FIG. 2: S1004; YES), the search control unit 140 decides whether the packet is the head fragment packet or not (FIG. 2: S1006). The search control unit 140 checks the fragment packet offset value of the IPv4 header of the packet. The search control unit 140, when the fragment offset value is 0, decides that the packet is the head fragment packet. Further, the search control unit 140, when the fragment offset value is not 0, decides that the packet is the intermediate fragment packet or the last fragment packet.

Figure 17:
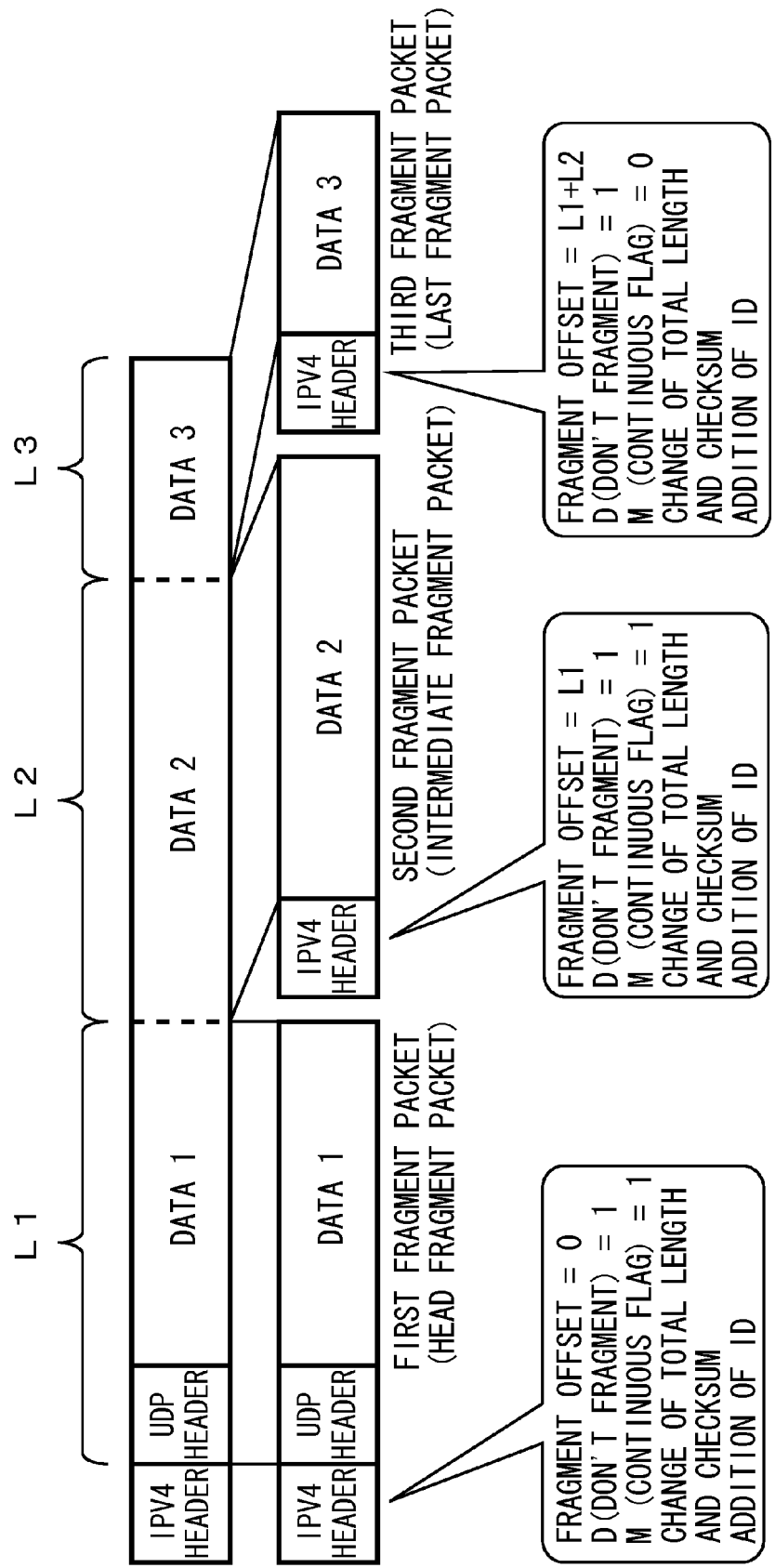
FIG. 17 is a diagram illustrating a fragment format of an IPv4 packet (UDP packet).
Figure 18:
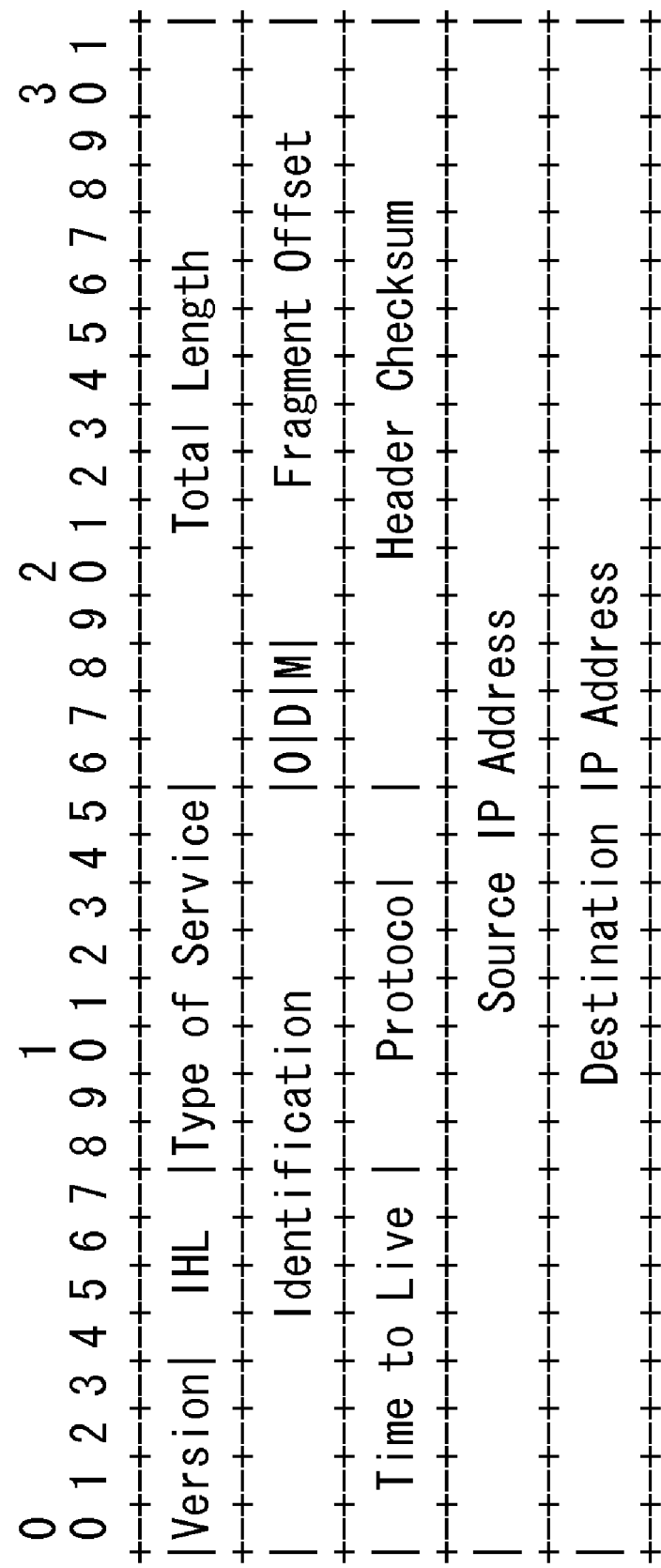
FIG. 18 is a diagram illustrating an example of an IPv4 header.
Figure 20:
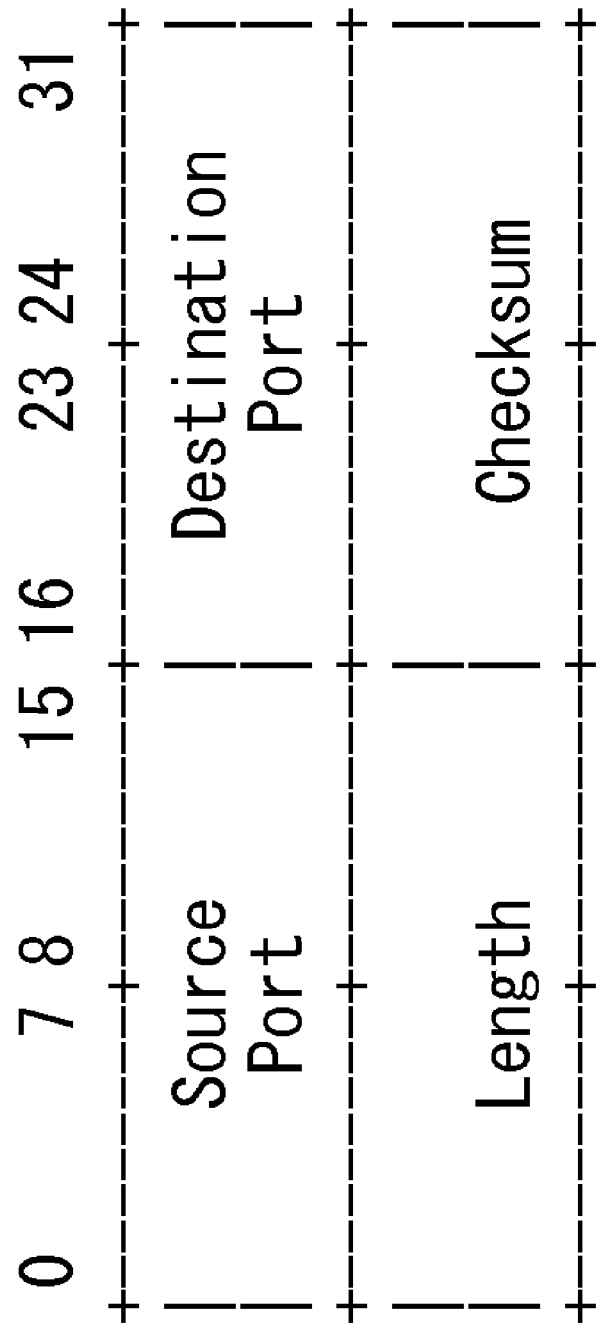
FIG. 20 is a diagram illustrating an example of a UDP header.

The search control unit 140, when deciding that the received packet is the head fragment packet (FIG. 2: S1006; YES), extracts the Source IP address, the Destination IP address and the Protocol from the IPv4 header of the received packet, and extracts the Source Port and the Destination Port from the UDP header thereof (FIG. 4: S3002). This process is the same as in the case of deciding that the received packet is the normal packet. The head fragment packet contains the IPv4 header and the UDP header and the search control unit 140 can therefore extract these items of information (FIGS. 17, 18, 20).

Figure 4:
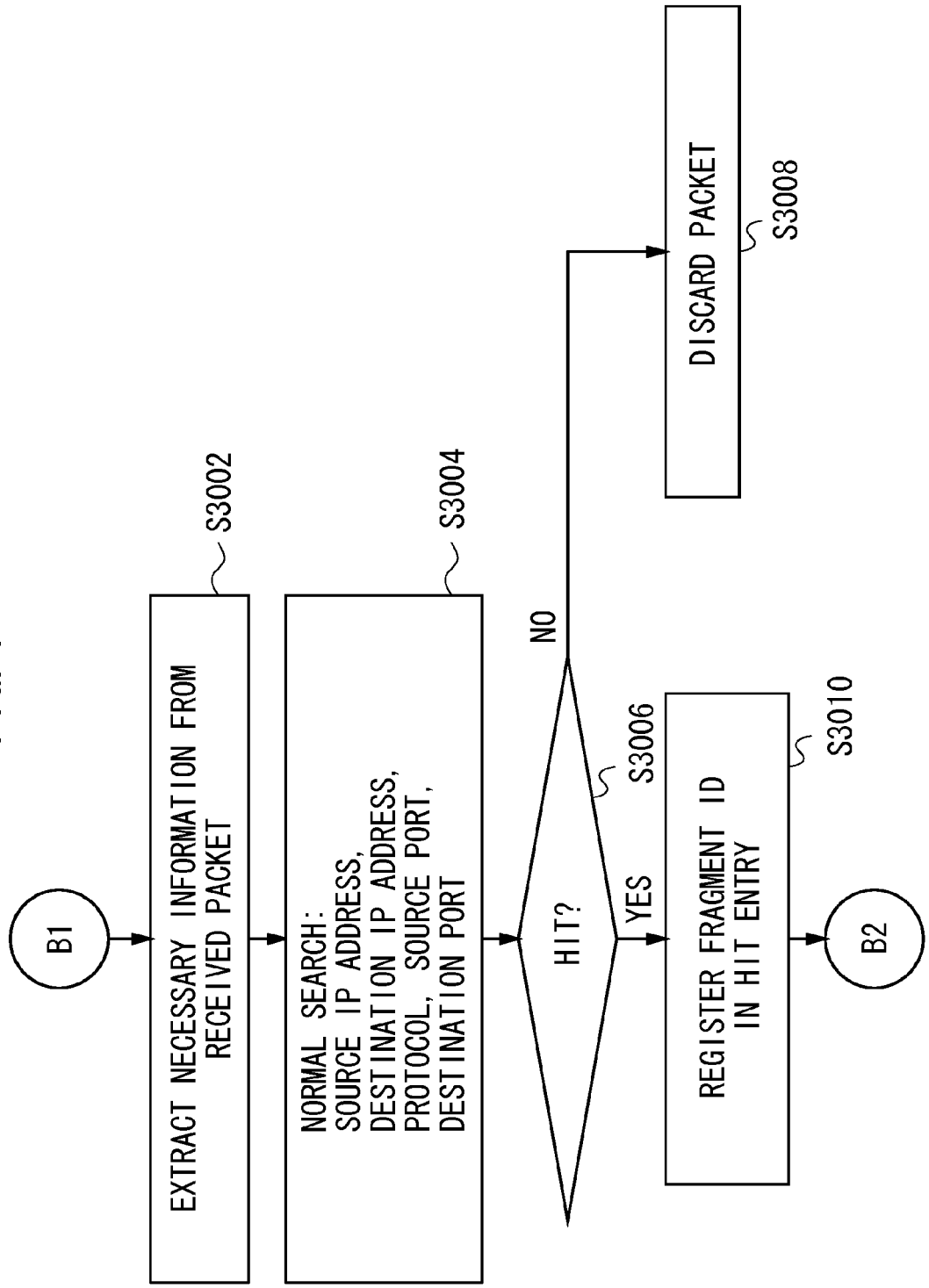
FIG. 4 is a flowchart illustrating an example (3) of the processing flow of the communication device in the embodiment.

The search control unit 140 requests the CAM 142 to search for the search targets such as the Source IP address, the Destination IP address, the Protocol, the Source Port and the Destination Port (FIG. 4: S3004).

Figure 13:
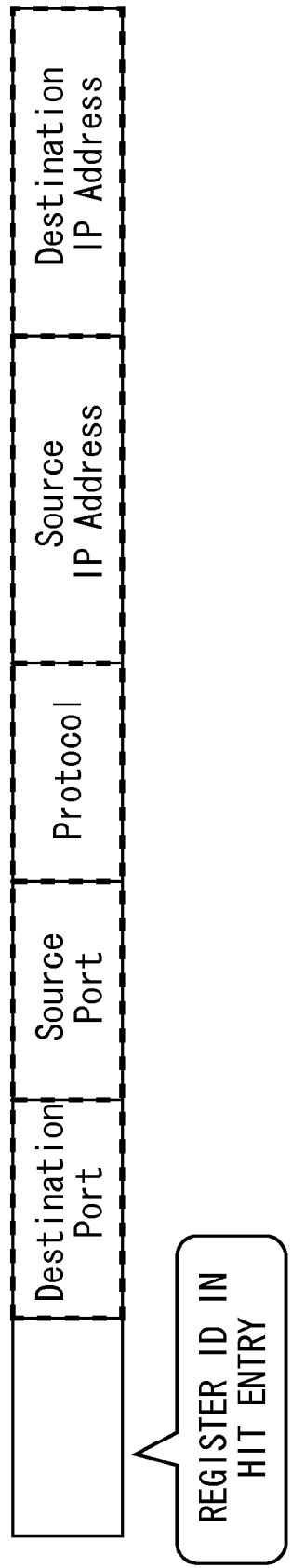
FIG. 13 is a diagram illustrating how the CAM is used.

FIG. 13 is a diagram illustrating an example of how the CAM is utilized. In the case of the head fragment packet, similarly to the case of the normal packet, the search targets are the Source IP address, the Destination IP address, the Protocol, the Source Port and the Destination Port.

The search control unit 140 receives the search result from the CAM 142. If there is not the hit Entry as the result of the search (FIG. 4: S3006; NO), the search control unit 140 treats the packet as the unnecessary packet and discards this packet (FIG. 4: S3008). Incidentally, another available processing method is that the higher-order control unit is notified of this purport without discarding the packet in the same way with the normal packet. In this case, the notification is given to the higher-order control unit after the reassembly.

Moreover, whereas if there is the hit Entry as the result of the search (FIG. 4: S3006; YES), the search control unit 140 extracts the ID of the IPv4 header of the received packet and registers the ID in the hit Entry (FIG. 4: S3010).

The search control unit 140 acquires the packet processing information of this packet that is stored in the SRAM 144, and stores the information in the packet-associated control area (FIG. 5: S3012). Further, the search control unit 140 sets the fragment control area in the hit Entry. The search control unit 140 stores a head fragment reception flag and a packet payload size in the fragment control area (FIG. 5: S3014).

The search control unit 140 writes the UDP header and the data of the head fragment packet in a head address position of the assembly area (FIG. 5: S3016). Further, the search control unit 140 stores the IPv4 header of the head fragment packet in a header storage field of the assembly area.

The search control unit 140 stands by for an arrival of the fragment packet subsequent to the head fragment packet (FIG. 5: S3020).

(Intermediate Fragment Packet and Last Fragment Packet)

Referring back to FIG. 2, when deciding that the received packet is not the head fragment packet FIG. 2: S1006; NO), the search control unit 140 extracts the Source IP address and the ID from the IPv4 header of the received packet (FIG. 6: S4002). If the received packet is not the head fragment packet, this packet is the intermediate fragment packet or the last fragment packet. The search control unit 140 requests the CAM 142 to search for the search targets such as the Source IP address and the ID (FIG. 3: S4004).

Figure 15:
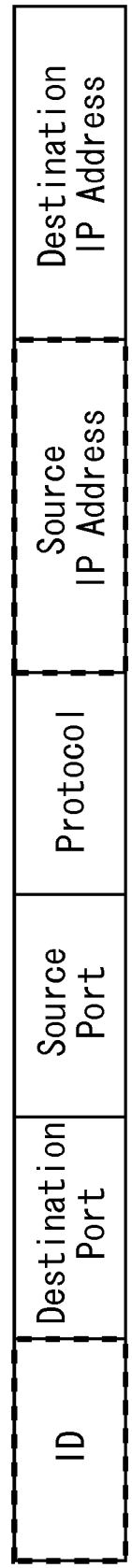
FIG. 15 is a diagram illustrating how the CAM is used.
Figure 16:
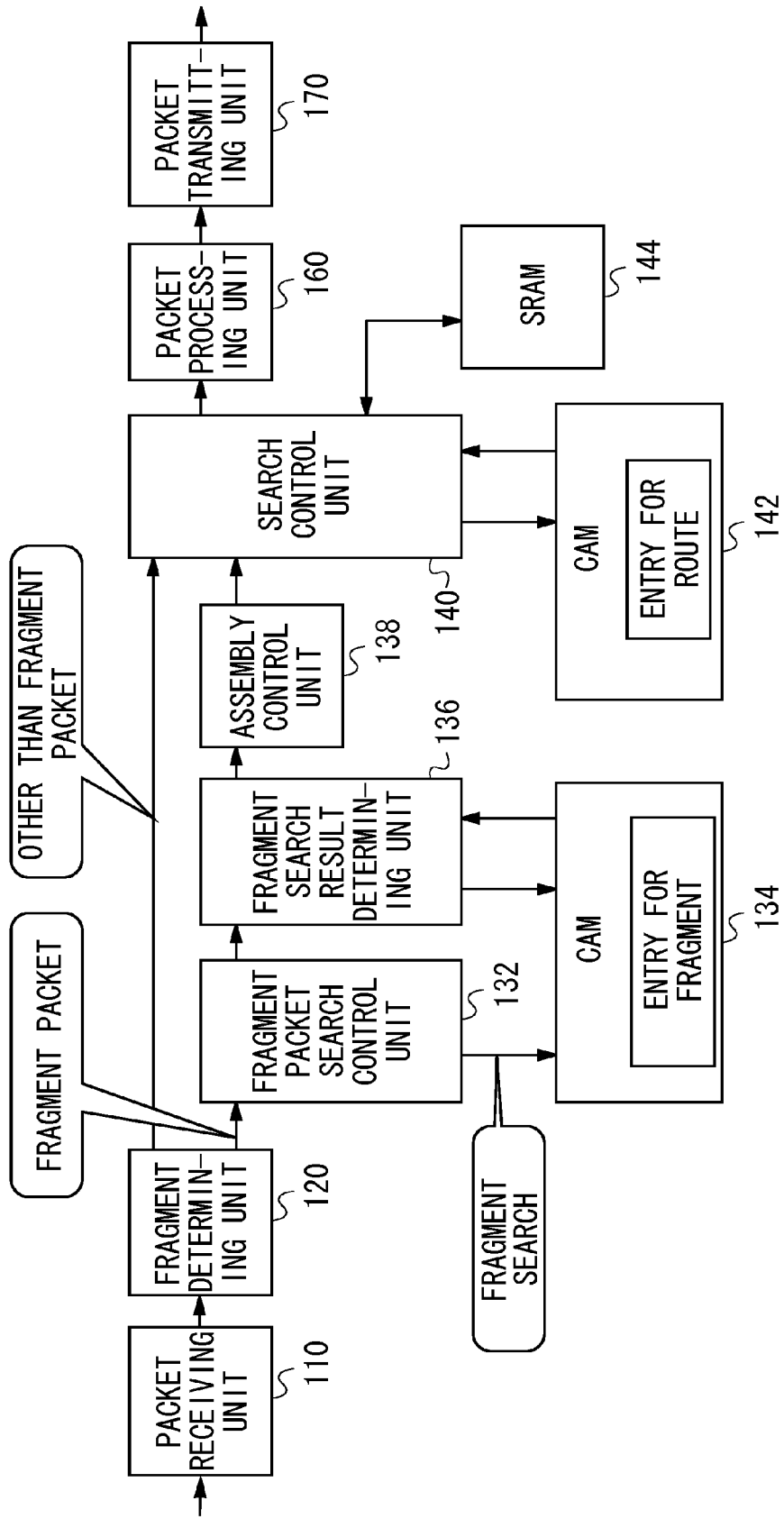
FIG. 16 is a diagram illustrating a conventional communication device which executes a reassembly process.

FIGS. 14 and 15 are diagrams each illustrating how the CAM is used. In the case of the intermediate fragment packet and the last fragment packet, the search targets are the Source IP address and the ID. If the head fragment packet corresponding to the intermediate fragment packet and the last fragment packet is not yet reached, the ID is not registered (FIG. 14). Whereas if the head fragment packet corresponding to the intermediate fragment packet and the last fragment packet has already been reached, the ID is registered (FIG. 15).

The search control unit 140 receives the search result from the CAM 142. If there is the hit Entry as the result of the search (FIG. 6: S4006; YES), the CAM 142 notifies the search control unit 140 of the hit Entry (FIG. 6: S4010). In this case, this implies that the head fragment packet corresponding to the received packet (the intermediate fragment packet or the last fragment packet) has already been reached.

Figure 6:
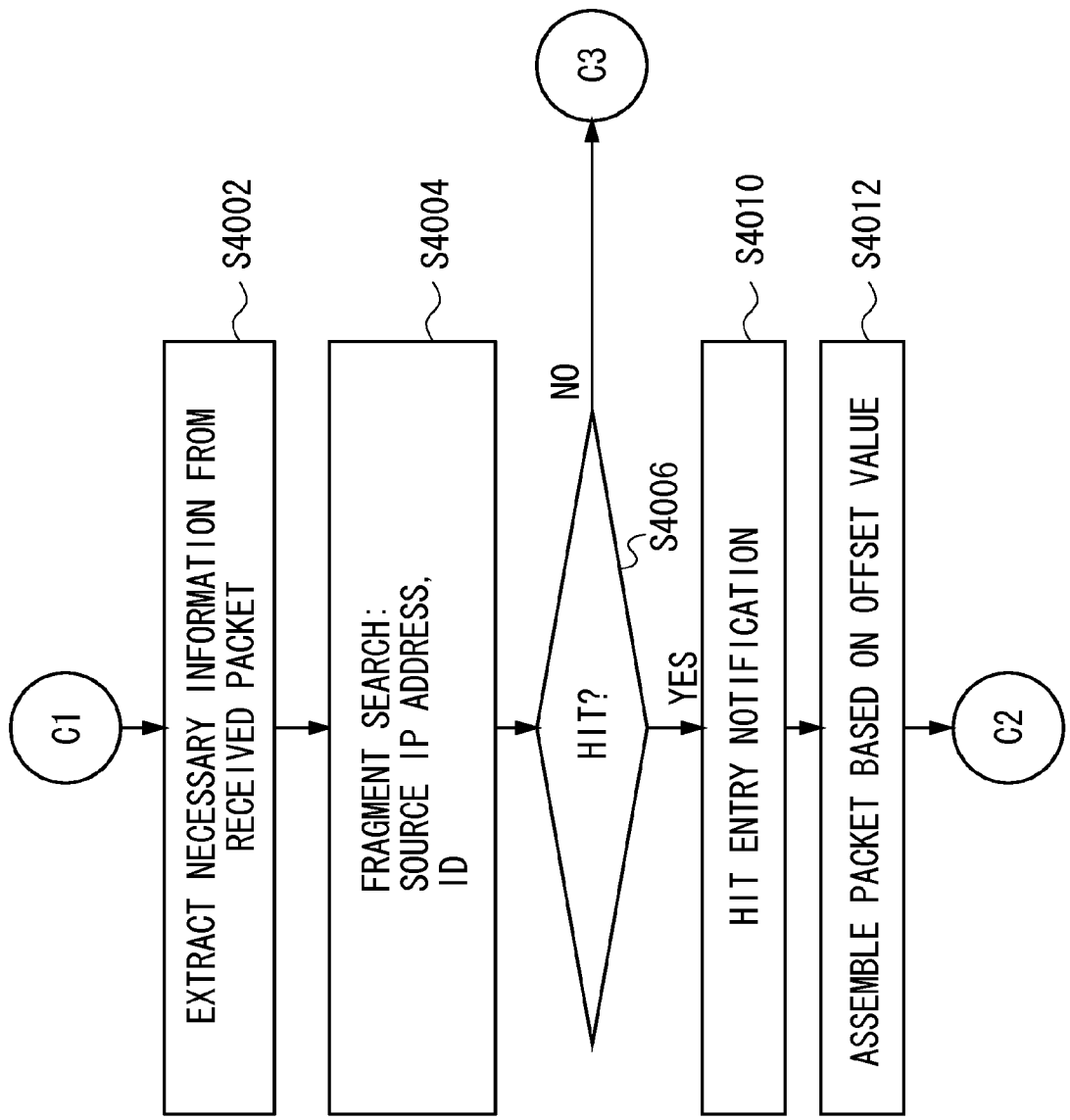
FIG. 6 is a flowchart illustrating an example (5) of the processing flow of the communication device in the embodiment.

The search control unit 140 extracts the fragment offset value from the IPv4 header of the received packet, and writes the data of the received packet in the address position of the assembly area, which is associated with the fragment offset value (FIG. 6: S4012). Moreover, the search control unit 140 stores the IPv4 header of the received packet in the header field of the assembly area.

Figure 7:
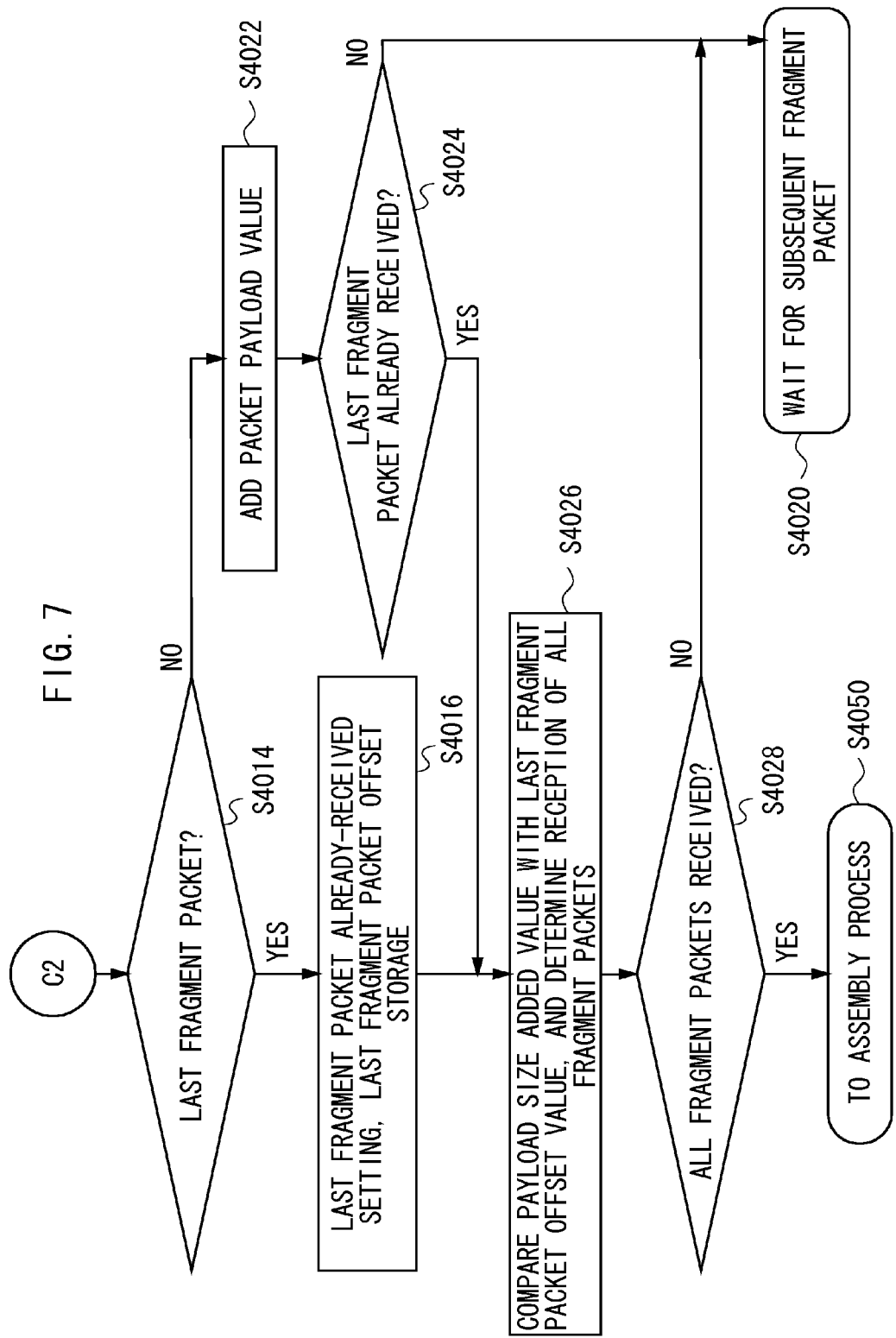
FIG. 7 is a flowchart illustrating an example (6) of the processing flow of the communication device in the embodiment.

The search control unit 140 decides whether the received packet is the last fragment packet or not (FIG. 7: S4014). The search control unit 140 checks an M flag of the IPv4 header of the packet. The search control unit 140, when the M flag is set such as M=0, decides that the packet is the last fragment packet. Furthermore, the search control unit 140, when the M flag is set such as M=1, decides that the packet is not the last fragment packet (but the intermediate fragment packet).

If the received packet is the last fragment packet (FIG. 7: S4014; YES), the search control unit 140 stores the last fragment reception flag and the fragment offset value of the IPv4 header of the last fragment packet in the fragment control area (FIG. 7: S4016). The search control unit 140 decides whether all of the fragment packets are received or not (FIG. 7: S4026).

If the received packet is the intermediate fragment packet (FIG. 7: S4014: NO), the search control unit 140 adds the packet payload size of the packet to the packet payload size in the fragment control area (FIG. 7: S4022). A total sum of the packet payload sizes of the already-received fragment packets is stored in the packet payload size (payload size field) in the fragment control area. The search control unit 140 decides whether the last fragment packet has already been received or not (FIG. 7: S4024). The search control unit 140 checks the last fragment reception flag in the fragment control area, thereby deciding whether the last fragment packet has already been received or not. The search control unit 140, if none of the last fragment packet has already been received (FIG. 7: S4024; NO), waits for the subsequent fragment packet (FIG. 7: S4020). The search control unit 140, if the last fragment packet has already been received (FIG. 7: S4024; YES), decides whether all of the fragment packets are received or not (FIG. 7: S4026).

The search control unit 140 decides whether all of the fragment packets are received or not (FIG. 7: S4026). The search control unit 140 compares, in the fragment control area, the fragment offset value of the last fragment packet with the packet payload size. The fragment offset value of the last fragment packet is equal to the size of all of the fragment packets excluding the last fragment packet. Further, the packet payload size in the fragment control area represents the total sum of the packet payload sizes of the fragment packets other than the last fragment packet. Accordingly, when the fragment offset value of the last fragment packet is coincident with the packet payload size, it is determined that the all of the fragment packets are received.

The search control unit 140, if all of the fragment packets are not yet received (FIG. 7: S4028; NO), waits for the subsequent fragment packet (FIG. 7: S4020). The search control unit 140, when all of the fragment packets are received (FIG. 7: S4028; YES), terminates the search control process and transitions to the assembly process (FIG. 7: S4050).

Referring back to FIG. 6, there is not the hit Entry as the result of the search (FIG. 6: S4006; NO), the head fragment packet corresponding to the received packet is not yet reached. The search control unit 140 retains the received packet.

Figure 8:
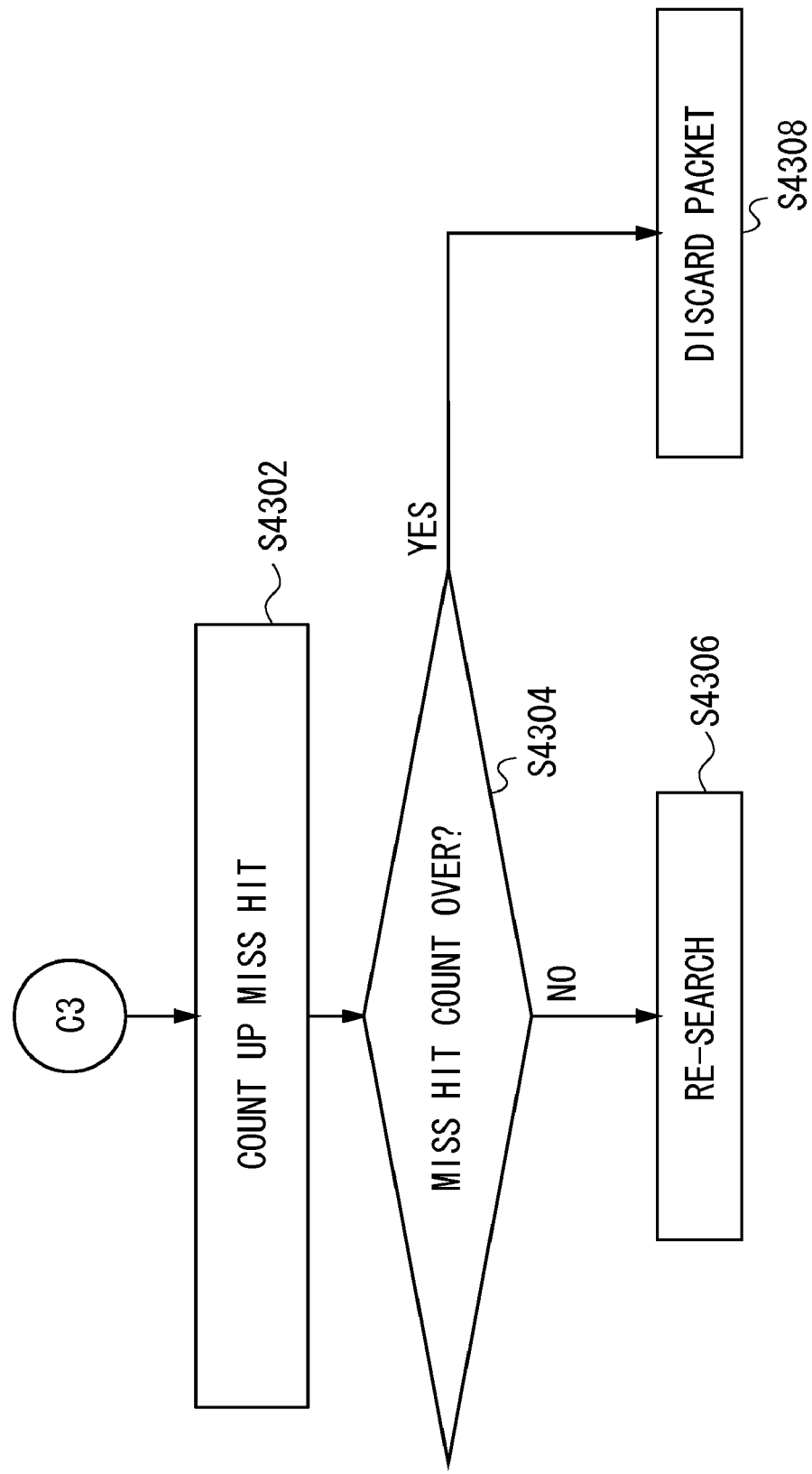
FIG. 8 is a flowchart illustrating an example (7) of the processing flow of the communication device in the embodiment.

The search control unit 140 adds a Miss Hit count of the received packets (FIG. 8: S4302). The search control unit 140 decides whether the Miss Hit count of the received packets exceeds a specified value or not (FIG. 8: S4304). If over the specified value (FIG. 8: S4304; YES), the search control unit 140 discards the received packet because of being unable to receive the head fragment packet corresponding to the received packet due to a packet loss etc (FIG. 8: S4308). This is because if the head fragment packet is not reached, the fragment packet reassembly process may not be executed.

The search control unit 140, if the Miss Hit count does not exceed the specified value (FIG. 8: S4304; NO), the re-searching process is performed (FIG. 8: S4306).

Incidentally, an available scheme is that the search requests given to the CAM are temporarily inputted to a search queue and executed sequentially from the head of the search queue. Even when making the re-search, the re-search can be done by inputting a re-search request to the search queue.

Operation and Effect in Embodiment

According to the communication device in the embodiment, for the device requiring the normal search such as the route search, the searching process for identifying the same fragment of the fragment packet can be executed based on the search control and the entry, which are common to the route searching process etc. Further, even if the receiving sequence of the fragment packets is reversed, the same fragments can be identified, and the fragment packets can be reassembled.

According to the communication device in the embodiment, the expensive CAM and search control unit can be utilized efficiently, whereby the device can be simplified and downsized, and the costs can be reduced down. Further, the process for the fragment identification and the process for the route search can be executed simultaneously, thereby enabling the throughput to be improved.

Modified Example

Re-Searching Process

A modified example of the re-searching process in step S4306 in FIG. 8 will be described with reference to the drawings. The configuration other than what will be discussed as below is the same as the configuration in the embodiment described above.

(Reception of Head Fragment Packet)

Figure 9:
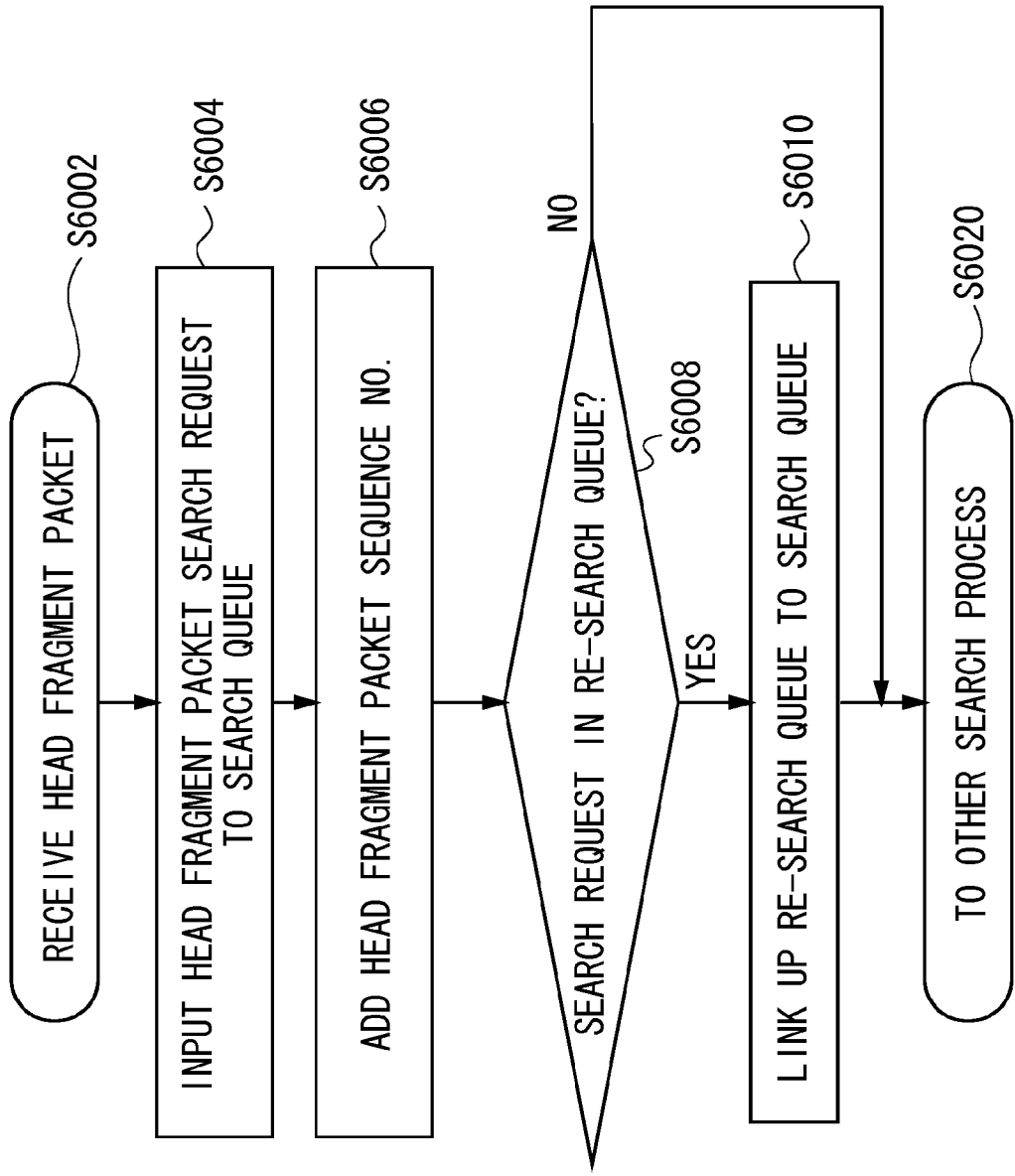
FIG. 9 is a flowchart illustrating an example of a processing flow for a re-search process when receiving a head fragment packet.

FIG. 9 is a flowchart illustrating an example of a processing flow for the re-searching process when receiving the head fragment packet.

The search control unit 140 receives the head fragment packet (S6002), and inputs the head fragment packet search request to the search queue (S6004).

The search control unit 140 counts up (adds) a head fragment packet sequence No and stores (memorizes) the head fragment packet sequence No in a specified area (S6006).

The search control unit 140 checks whether the re-search queue contains the fragment search request or not (S6008). The search control unit 140, if the re-search queue contains the fragment search request (S6008; YES), links up this re-search queue to the search queue (S6010). When the head fragment packet is thereby received, the fragment search request contained in the re-search queue is executed.

The search control unit 140 transitions to another search process (S6020).

(Reception of Intermediate and Last Fragment Packets)

Figure 10:
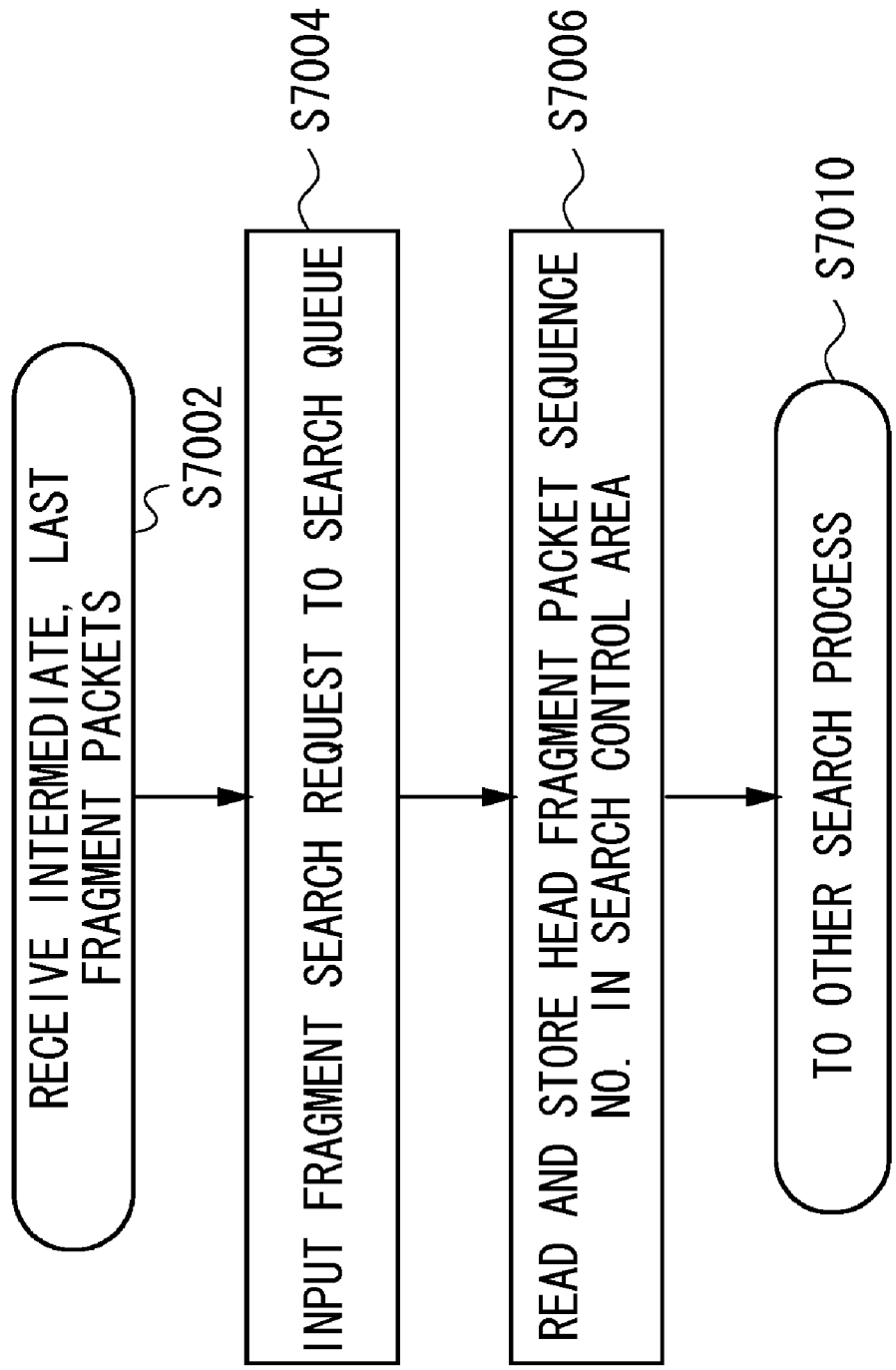
FIG. 10 is a flowchart illustrating an example of a processing flow for the re-search process when receiving an intermediate fragment packet or a last fragment packet.

FIG. 10 is a flowchart illustrating an example of a processing flow for the re-search process when receiving the intermediate fragment packet and the last fragment packet.

The search control unit 140 receives the intermediate fragment packet and the last fragment packet (S7002), and inputs the fragment search requests of the intermediate fragment packet and the last fragment packet to the search queue (S7004).

The search control unit 140 reads the head fragment packet sequence No and stores (memorizes) this packet sequence No in the search control area (S7006).

The search control unit 140 executes another search process (S7010).

(Re-Search Executing Process)

Figure 11:
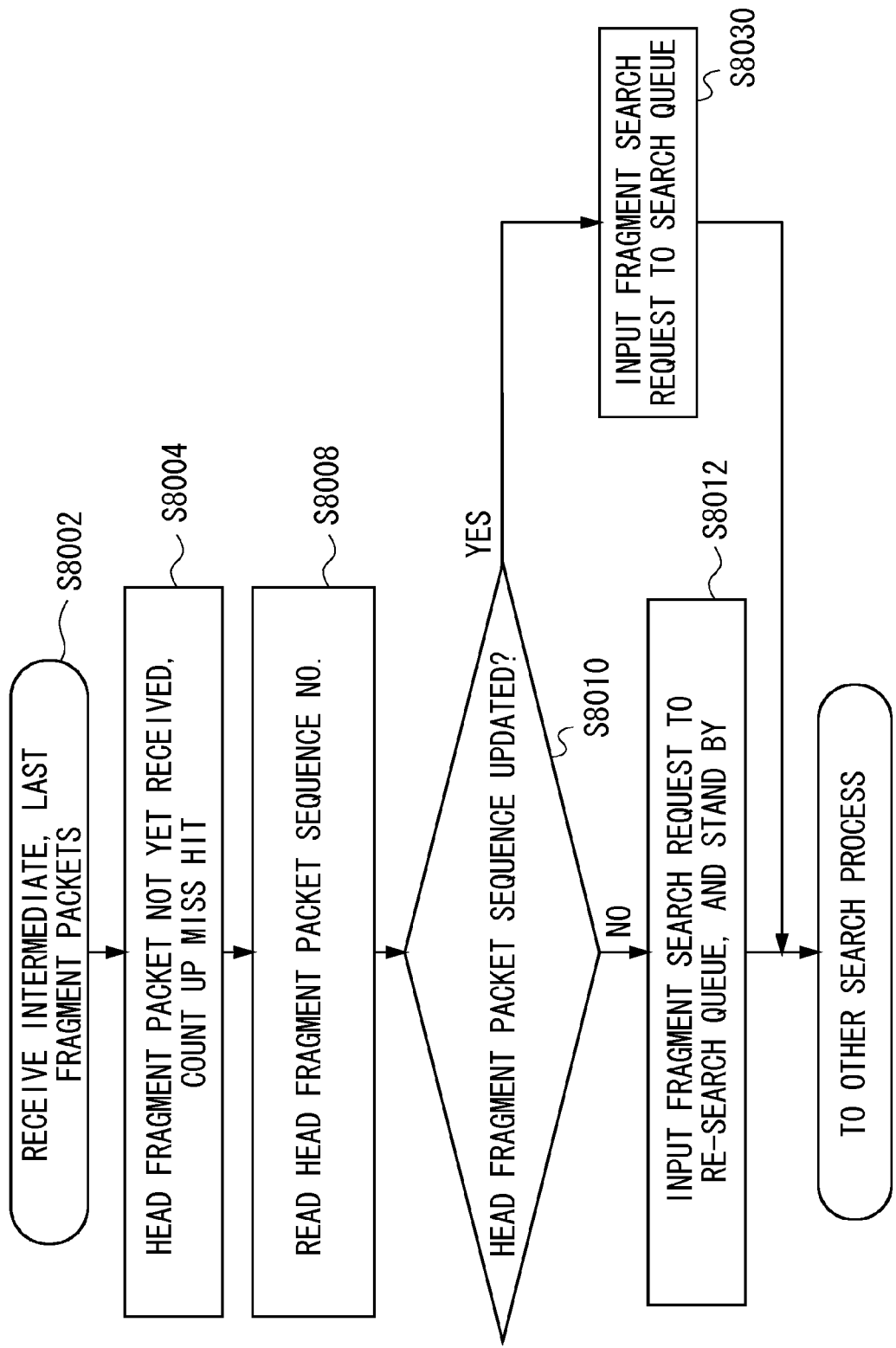
FIG. 11 is a flowchart illustrating an example of a processing flow when executing the re-search process.

FIG. 11 is a flowchart illustrating an example of a processing flow when executing the re-search process.

The search control unit 140 receives the intermediate fragment packet and the last fragment packet (S8002), does not yet receive the head fragment packet, and counts up the Miss Hit count (S8004) (corresponding to steps S4302 and S4304 in FIG. 8), in which case the search control unit 140 reads the head fragment packet sequence No (S8008).

The search control unit 140 compares the head fragment packet sequence No (A) read in step S8008 with the head fragment packet sequence No (B) stored in the search control area (S8010).

The search control unit 140, if the sequence No (A) is different from the sequence No (B) as a result of the comparison (S8010; YES), decides that a new head fragment packet has been received. The search control unit 140 immediately inputs the fragment search request to the search queue (S8030).

The search control unit 140, if the sequence No (A) is coincident with the sequence No (B) as the result of the comparison (S8010; NO), decides that the new head fragment packet is not received. The search control unit 140 inputs the fragment search request to the re-search queue and stands by.

Operation and Effect in Modified Example

According to the communication device having the re-search process in the modified example, even when the fragment packet receiving sequence is reversed, without a decrease in search throughput to the greatest possible degree through the re-search process, the same fragments can be identified, and the fragment packets can be reassembled.

According to the communication device having the re-search process in the modified example, the downsizing of the hardware is actualized, and further the fragment packets can be reassembled at a high speed.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A communication device transmitting and receiving packet data via a network, the communication device comprising:
    a receiving unit to receive a packet;
    a packet determining unit to determine if the received packet is a fragment packet or not a fragment packet, upon determination that the received packet is the fragment packet then further to identify if the fragment packet is a head fragment packet, an intermediate fragment packet or a last fragment packet;
    a packet search control unit to extract, upon receiving the head fragment packet, a fragment identifier from the head fragment packet, to register the fragment identifier in a search table along with location of payload associated with the head fragment packet, and to extract, upon receiving either the intermediate fragment packet or the last fragment packet, a fragment identifier from the intermediate fragment packet or the last fragment packet, to register the fragment identifier in the search table along with location of payload associated with the intermediate fragment packet or the last fragment packet;
    an assembly processing unit to create an original packet by assembling payloads associated with the head fragment packet, the intermediate fragment packet, and the fragment packet based upon a common fragment identifier and the location of payload.

2. The communication device according to claim 1, wherein the packet search control unit, if the received packet is the intermediate fragment packet or the last fragment packet and when the common fragment identifier as the fragment identifier of the intermediate fragment packet or the last fragment packet do not hit in the search table, retains the intermediate fragment packet or the last fragment packet, and searches for the common fragment identifier as the fragment identifier of the intermediate fragment packet or the last fragment packet in the search table.

3. The communication device according to claim 2, wherein the packet search control unit, if the received packet is the intermediate fragment packet or the last fragment packet, counts a search-disabled count at which the common fragment identifier as the fragment identifier of the intermediate fragment packet or the last fragment packet do not hit in the search table, and, if the search-disabled count is over a specified count, discards the retained intermediate fragment packet or last fragment packet.

4. The communication device according to claim 2, wherein the packet search control unit, if the received packet is the head fragment packet, reads a sequence number stored in a first area, counts up the sequence number and stores the sequence number in the first area, if the received packet is the intermediate fragment packet or the last fragment packet, reads the sequence number stored in the first area, stores the sequence number in a second area, when the common fragment identifier as the fragment identifier of the intermediate fragment packet or the last fragment packet do not hit in the search table, reads the sequence number stored in the first area and the sequence number stored in the second area compares the sequence number stored in the first area with the sequence number stored in the second area, if these two sequence numbers are different from each other, search for the common fragment identifier as fragment identifier of the intermediate fragment packet or the last fragment packet in the search table, and if the compared sequence numbers are coincident with each other, search for the common fragment identifier in the search table after waiting for receiving a new head fragment packet.

5. A communication method of transmitting and receiving packet data via a network, the communication method comprising:
    receiving a packet;
    determining if the received packet is a fragment packet or not a fragment packet, upon determination that the received packet is the fragment packet then further to identify if the fragment packet, is a head fragment packet, an intermediate fragment packet, or a last fragment packet;
    extracting, upon receiving the head fragment packet, a fragment identifier from the head fragment packet, registering the fragment identifier in a search table along with location of payload associated with the head fragment packet, and extracting, upon receiving either the intermediate fragment packet or the last fragment packet, a fragment identifier from the intermediate fragment packet or the last fragment packet, registering the fragment identifier in the search table along with location of payload associated with the intermediate fragment packet or the last fragment packet;
    creating an original packet by assembling payloads associated with the head fragment packet, the intermediate fragment packet, and the fragment packet based upon a common fragment identifier and the location of payload.

* * * * *